Nov. 12, 1935.  J. E. REILLY  2,020,701
DISPENSING COVER FOR MILK CANS
Filed Aug. 11, 1934  2 Sheets-Sheet 1
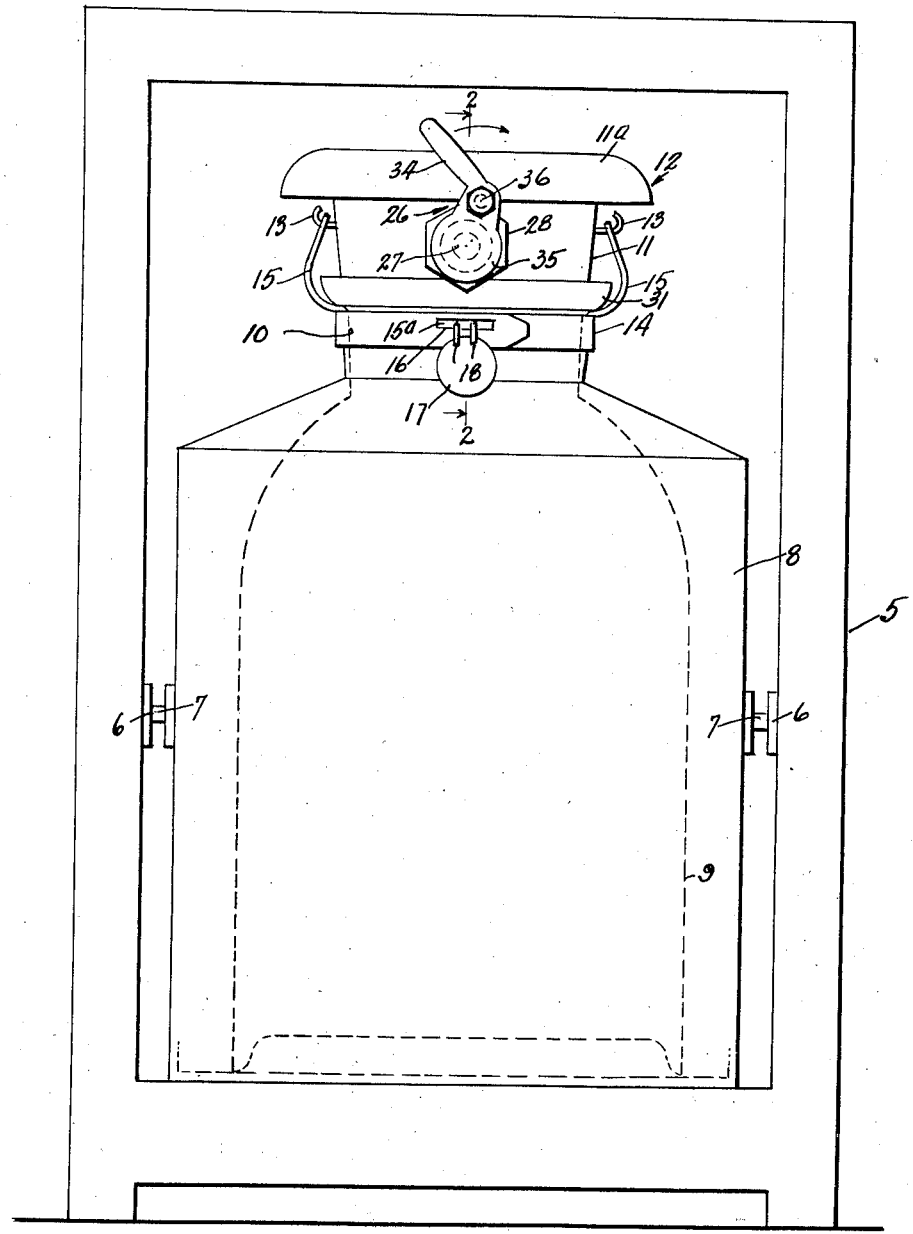
INVENTOR.
Joseph E. Reilly
BY
ATTORNEY.

Nov. 12, 1935. J. E. REILLY 2,020,701
DISPENSING COVER FOR MILK CANS
Filed Aug. 11, 1934  2 Sheets-Sheet 2
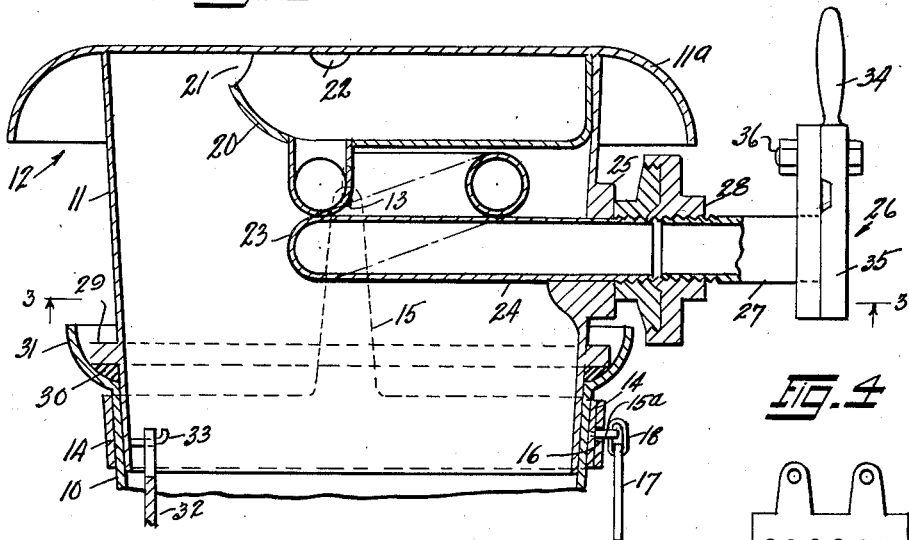
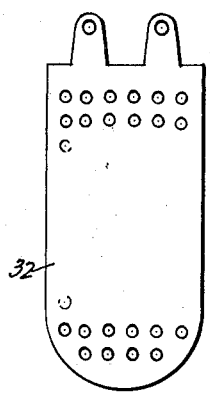
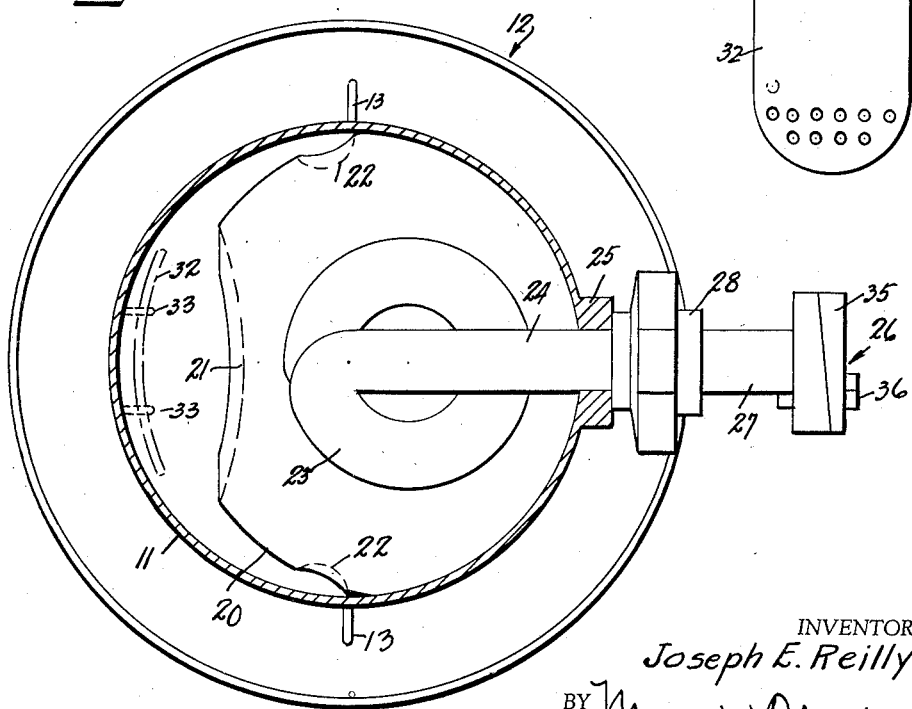
INVENTOR.
Joseph E. Reilly
BY Maurice Bloch
ATTORNEY.

Patented Nov. 12, 1935

2,020,701

UNITED STATES PATENT OFFICE 2,020,701

DISPENSING COVER FOR MILK CANS

Joseph E. Reilly, New York, N. Y.

Application August 11, 1934, Serial No. 739,407

5 Claims. (Cl. 221—98)

This invention relates to devices for dispensing liquids and more particularly to such devices especially adapted for dispensing loose milk.

One of the objects of the invention is to provide a sanitary device for dispensing loose milk without the use of the usual dipper.

Another object of the invention is to provide a milk can cover having a measuring receptacle therein, the said receptacle having a conduit secured thereto and extending to the exterior of the cover from whence the receptacle contents may be drawn.

A further object of the invention is to provide means for swingingly mounting a milk can so that milk may enter the receptacle within the cover for dispensing purposes.

A still further object of the invention is to provide an agitator for stirring the milk and maintaining same at an even consistency.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a front view of my improved milk dispensing device; Figure 2 is a fragmental sectional view through the cover and upper part of the milk can taken on line 2—2 Fig. 1; Figure 3 is a sectional view taken on line 3—3 Fig. 2 and looking in the direction of the arrows, and Figure 4 is a detail view of the agitator.

Referring now to the drawings in detail 5 indicates a stand or frame provided with a pair of sockets 6 adapted to receive trunnions 7 extending from the sides of a cooler or refrigerator 8 in which the milk can 9 is supported.

Fitting into the neck 10 of the milk can is the sleeve or body portion 11 extending from the lid 11a of the can cover 12 in which there is secured a pair of hooks 13 from which there is suspended a band 14 by means of a pair of straps 15 integral with the said band. The band 14 fits tightly around the exterior of the neck 11 of the milk can 9 and has a perforated bar or eye 15a at one end thereof which passes through a slot 16 at the opposite end of the said band. A disc 17 is suspended from the bar 15 by means of a pair of links 18 and acts as a lock or seal for the milk can.

Located at the top of the cover 12 is a removable receptacle or cup 20 which is provided near the top thereof with one large opening 21 and a pair of smaller openings 22, the object of which will shortly be described. Depending from the bottom of the receptacle 20 is a removable tubular coil or conduit 23 provided with straight branch or arm 24 which extends through an opening in a boss 25 integral with or secured to the neck 11 of the can cover 12. A faucet or other valve 26 having a tubular extension 27 is joined to the coil branch 24 by means of a union 28 threaded to the exterior of the said branch 24 and extension 27.

The cover 12 is provided with an annular rib or band 29 which is seated and pressed tightly against a rubber gasket 30 within the flange 31 of the milk can 9 to make a liquid tight joint.

Before dispensing any milk from the can, the said can together with the refrigerator is oscillated or swung about the pivots or trunnions 7 through an angle of more than one hundred and eighty degrees thus permitting milk to enter into the receptacle 20 through the openings 21 and 22 some of which will flow out again through the said openings when the milk can is swung back into normal position. The said receptacle is so designed that a predetermined quantity of milk say for instance a pint will remain therein and in the coil 23 when in upright position.

During the swinging or oscillating action a perforated plate 32 suspended from hooks 33 will act as an agitator and stir the milk to maintain same at an even consistency throughout.

To dispense the milk in the receptacle the handle 34 of the faucet closure disc 35 is pulled in the direction of arrow Fig. 1. This action will swing the said disc about the pivot 36 open the faucet and permit the milk to flow out of the receptacle and coil.

From the foregoing it will be seen that I have provided a simple efficient and sanitary dispensing device for dispensing loose milk or the like, and have also provided a seal which will prevent any tampering with the contents of the milk can. To clean the device a stream of water may be admitted through the faucet which will pass through the coil into the receptacle and out through the openings 21 and 22.

Having described my invention what I claim as new and desire to secure by Letters Patent is:

1. A liquid can cover comprising a lid, a can engaging sleeve depending therefrom, a receptacle in the sleeve having liquid inlet and outlet openings, a conduit leading from the receptacle and extending outwardly through the sleeve, and a dispensing valve on the outwardly extending conduit portion.

2. A liquid can cover comprising a lid, a sleeve depending therefrom, a receptacle in the sleeve having liquid inlet and outlet openings, a conduit leading from the receptacle and extending outwardly through the sleeve, a dispensing valve on the outwardly extending conduit portion, and a device for maintaining the can cover and receptacle carried thereby in operative engagement with the can.

3. In a liquid holding can, a cover comprising a lid, a sleeve depending therefrom, a receptacle in the sleeve having liquid inlet and outlet openings, a conduit leading from the receptacle and extending outwardly through the sleeve, a dispensing valve on the outwardly extending conduit portion, a leak-proof joint between the cover and can, and means for maintaining the cover in leakproof engagement with the can.

4. In a milk can, a cover therefor, a sleeve forming a part of said cover, and extending into the can, a measuring receptacle in the cover and in open communication therewith, a tubular conduit leading from the receptacle to the exterior of the sleeve, and an outlet valve on the said conduit.

5. In a swingably and invertibly mounted liquid holding can a cover secured thereto, a can engaging sleeve on the cover and extending into the can, a measuring receptacle in the cover to receive liquid when the can is inverted, a conduit leading from the receptacle and extending laterally to the exterior of the sleeve, and an outlet valve on the said conduit.

JOSEPH E. REILLY.